(12) United States Patent
Putterman et al.

(10) Patent No.: US 7,213,228 B2
(45) Date of Patent: May 1, 2007

(54) METHODS AND APPARATUS FOR IMPLEMENTING A REMOTE APPLICATION OVER A NETWORK

(75) Inventors: Daniel Putterman, San Francisco, CA (US); Brad Dietrich, San Francisco, CA (US); John Doornbos, San Francisco, CA (US); Pedro Freitas, San Francisco, CA (US)

(73) Assignee: Macrovision Corporation, Santa Clara, CA (US)

( * ) Notice: Subject to any disclaimer, the term of this patent is extended or adjusted under 35 U.S.C. 154(b) by 731 days.

(21) Appl. No.: 10/391,116

(22) Filed: Mar. 17, 2003

(65) Prior Publication Data

US 2004/0183827 A1    Sep. 23, 2004

(51) Int. Cl.
*G06F 9/44* (2006.01)
*G06F 9/65* (2006.01)

(52) U.S. Cl. .................. 717/109; 717/139; 715/700
(58) Field of Classification Search ........ 717/109–111, 717/171–173, 176–177, 113, 139; 709/203, 709/219, 225; 715/700, 500
See application file for complete search history.

(56) References Cited

U.S. PATENT DOCUMENTS

| | | | |
|---|---|---|---|
| 5,479,601 A * | 12/1995 | Matheny et al. ............ | 715/700 |
| 5,815,297 A | 9/1998 | Ciciora | |
| 5,930,473 A | 7/1999 | Teng et al. | |
| 5,943,680 A * | 8/1999 | Shimizu et al. ............. | 715/528 |
| 5,945,988 A | 8/1999 | Williams et al. | |
| 5,977,964 A | 11/1999 | Williams et al. | |
| 6,008,802 A | 12/1999 | Iki et al. | |
| 6,032,202 A | 2/2000 | Lea et al. | |

(Continued)

FOREIGN PATENT DOCUMENTS

EP    0 932 275 A2    7/1999

(Continued)

OTHER PUBLICATIONS

Mckeown et al. "Graphical tools for interactive image interpretation", ACM, vol. 16, No. 3, pp. 189-198, 1982.*

(Continued)

*Primary Examiner*—Anil Khatri
(74) *Attorney, Agent, or Firm*—Stattler Johansen & Adeli LLP

(57) ABSTRACT

A user interface, operating on a display client, for an application program, operating on a remote computer, is implemented such that the division of functionality between the application program and the user interface does not require the application program to possess information regarding the display capabilities of the display client. The remote computer transfers, to the display computer, an identification of a scene for a user interface of the application program. The scene defines an abstract layout for a screen display of the user interface. The user interface receives input from a user (e.g., the user selects a menu item from the user interface). The input event is interpreted, and data is generated based on the interpretation of the input event. The display client interprets the scene, and the data, based on the display capabilities of the display client. Based on this interpretation, the display client generates a display scene and display data for the scene. The display data is rendered on an output device of the display client.

23 Claims, 13 Drawing Sheets

U.S. PATENT DOCUMENTS

| | | | |
|---|---|---|---|
| 6,038,614 A | 3/2000 | Chan et al. | |
| 6,085,236 A | 7/2000 | Lea | |
| 6,111,677 A | 8/2000 | Shintani et al. | |
| 6,154,206 A | 11/2000 | Ludtke | |
| 6,160,796 A | 12/2000 | Zou | |
| 6,169,725 B1 | 1/2001 | Gibbs et al. | |
| 6,177,931 B1 | 1/2001 | Alexander et al. | |
| 6,182,094 B1 | 1/2001 | Humpleman et al. | |
| 6,219,839 B1 | 4/2001 | Sampsell | |
| 6,236,395 B1 | 5/2001 | Sezan et al. | |
| 6,237,049 B1 | 5/2001 | Ludtke | |
| 6,324,681 B1 * | 11/2001 | Sebesta et al. | 717/102 |
| 6,342,901 B1 * | 1/2002 | Adler et al. | 715/700 |
| 6,359,661 B1 | 3/2002 | Nickum | |
| 6,505,343 B1 * | 1/2003 | Menon et al. | 717/116 |
| 6,564,368 B1 * | 5/2003 | Beckett et al. | 717/113 |
| 6,567,427 B1 * | 5/2003 | Suzuki et al. | 370/535 |
| 6,574,617 B1 * | 6/2003 | Immerman et al. | 707/1 |
| 6,738,964 B1 * | 5/2004 | Zink et al. | 717/105 |
| 6,782,528 B1 * | 8/2004 | Bennett et al. | 717/109 |
| 6,792,615 B1 * | 9/2004 | Rowe et al. | 725/37 |
| 6,802,058 B2 * | 10/2004 | Banavar et al. | 717/138 |
| 6,820,260 B1 * | 11/2004 | Flockhart et al. | 717/173 |
| 6,865,593 B1 * | 3/2005 | Reshef et al. | 709/203 |
| 6,868,448 B1 * | 3/2005 | Gupta et al. | 709/226 |
| 6,892,228 B1 * | 5/2005 | Penders | 709/219 |
| 6,892,381 B2 * | 5/2005 | Kim et al. | 717/171 |
| 6,898,601 B2 * | 5/2005 | Amado et al. | 707/10 |
| 6,901,435 B1 * | 5/2005 | Sulcer et al. | 709/219 |
| 6,925,200 B2 * | 8/2005 | Wood et al. | 382/132 |
| 7,127,516 B2 * | 10/2006 | Inoue et al. | 709/229 |
| 2001/0043700 A1 | 11/2001 | Shima et al. | |
| 2002/0078293 A1 | 6/2002 | Kou et al. | |
| 2002/0104091 A1 | 8/2002 | Prabhu et al. | |
| 2003/0046437 A1 | 3/2003 | Eytchison et al. | |

FOREIGN PATENT DOCUMENTS

| | | |
|---|---|---|
| EP | 1217787 A2 | 6/2002 |
| WO | WO99/14945 | 3/1999 |
| WO | WO99/35753 | 7/1999 |
| WO | WO99/64969 | 12/1999 |
| WO | WO00/17738 | 3/2000 |
| WO | WO00/59230 | 10/2000 |

OTHER PUBLICATIONS

Barthelmess et al, "Distributed pointing for multimodal collaboration over sketched diagrams", ACM ICMI, pp. 10-17, 2005.*

Boukerche et al, "Scheduling and bufferiing mechanism for remote rendering streaming in virtual walkthrough class at applications", ACM WMuMeP, pp. 53-60, 2006.*

Ou et al, "Gestural communication over video stream: supporting multimodal interaction for remote collaborative physical tasks", ACM ICMI, pp. 242-249, 2003.*

* cited by examiner

METHODS AND APPARATUS FOR IMPLEMENTING A REMOTE APPLICATION OVER A NETWORK

BACKGROUND OF THE INVENTION

1. Field of the Invention

The present invention is directed toward the field of network software, and more particularly towards implementing an application remote from a computer.

2. Art Background

Prior art techniques exist to "remote" applications. In general, a remote application is an application that runs on a first computer but provides the functionality of the application to a second computer (e.g., implements a user interface) remote from the first computer. Remote application techniques have been used in client-server environments, wherein the application programs are stored on a server, and the client computers accesses the server to obtain functionality from the applications. The X Windows environment remotes applications such that thin client computers, or terminals, access a computer, such as a server, over a network to obtain the application's functionality at the terminals. For example, a server may host a word processing application. The thin client computer or terminal communicates with a server to operate the word processing program. The application program, running on the server, implements the user interface at the local computer for the underlying application program.

One issue that arises when implementing remote applications is that the remote applications require specific knowledge about the display characteristics of the client computer or terminal. If the client-server environment has many client computers, then the remote application must know the requirements of each client computer. This limits the types of devices or computers that the remote application can support, or significantly increases complexity of the server software to support the various types of devices. Therefore, it is desirable to develop software that permits a remote application to operate on a client computer or device without requiring the remote application to have any knowledge of the client's configuration.

Typically, applications implement a user interface using a user interface tool kit, sometimes referred to as a widget set, a rendering engine, and underlying hardware to display the user interface. The application provides parameters to the user interface tool kit based on specifics of the application. For example, some applications define buttons, toolbars, menus, etc. for use with the application. The user interface tool kit provides specific layout information for the application requirements. For example, the user interface tool kit may specify placement of the buttons, toolbars and menus used in the application. This layout is sometimes referred to as a logical layout of the user interface. The rendering engine, which receives the logical layout from the user interface tool kit, defines how to translate the logical layout to a physical representation for rendering on an output display. For example, if the remote computer display is a graphics display, then the rendering engine may convert digital data to RGB data for storage in a frame buffer for rendering on the output display. The user interface hardware may include, for a graphics display, a frame buffer, graphics processor and raster scan display for rendering pixel data.

Typically, to remote an application, the application and user interface tool kit software are run on the remote computer (i.e., the computer running the remote application). The local computer (i.e., the computer providing the user interface) includes the rendering engine and display hardware. An interface between the remote computer and local computer defines specific parameters for displaying information on the local computer (e.g., screen resolution, graphics or textual display, color palettes supported, etc.). Using this interface, the remote application specifies a logical layout supported by the physical rendering of the local client. For example, the remote application may specify, in a logical layout, the toolbar at the top of the output display. In order to ensure that the toolbar is readable, the remote application knows the overall resolution of the output display on the local client. The rendering engine at the local client translates the data for the toolbar, and stores the graphics data in the frame buffer at the local client. The contents of the frame buffer are thereafter rendered on the local client's output display.

Internet technology uses markup languages and Web browsers to display Web applications on local computer displays. Using Web browser technology, the application running on the web server does not need to know the specifics of the client display characteristics. However, the application logic is typically tuned to a specific display resolution, particularly if the web page contains graphic information. Often times Web applications specify to the user at the local computer a viewing resolution for the Web site because the Web application was designed for that specific resolution. Thus, Web technology still requires the application to have specific knowledge of the display characteristics of a computer that displays Web pages. In addition, user interfaces on the Web are very disconnected, so as to require splitting the application logic between the server and the client (e.g., Javascript). Alternatively, the Web applications are not very smooth and interactive applications. Although Web technology may be useful because most users view the information from desktop or notebook computers with a pre-defined resolution, the technology is not effective for use in systems that integrate devices with different types of displays. Accordingly, it is desirable to develop a remote application technology that permits using local client displays for remote applications regardless of the type of display at the local client.

SUMMARY OF THE INVENTION

A user interface for an application program is implemented on a display client. The core application logic for the application program is executed on the remote computer. The division of functionality between the application program, operating on the remote computer, and the user interface, operating on the display client, does not require the application program to possess information regarding the display capabilities of the display client. The remote computer transfers, to the display client, an identification of a scene for a user interface of the application program. The scene defines an abstract layout for a screen display of the user interface. The user interface receives input from a user (e.g., the user selects a menu item from the user interface). The input event is interpreted, and data is generated based on the interpretation of the input event. The display client interprets the scene and the data based on the display capabilities of the display client. Based on this interpretation, the display client generates a display scene and display data for the scene. The display data is rendered on an output device of the display client.

In one embodiment, the display client stores a plurality of pre-defined scenes, and receives a scene descriptor from the application logic. In response, the display client instantiates the scene based on the pre-defined scenes and the scene descriptor. A scene includes a plurality of slots. To render the display scene, the display client iterates through the slots of the scene to populate the display data. In one embodiment, a slot is implemented using a widget. A widget includes a controller, a model and a view. The controller interprets the input event, the model generates data in response to the interpretation of the input event, and the view renders the data on the display client. The controller, model, and view portions of a widget maybe implemented at the display client or remote from the display client.

DETAILED DESCRIPTION

Media Convergence Platform:

A media convergence platform provides an efficient and easy way for one or more users to manage and playback media within a "media space." As used herein, a "media space" connotes one or more media storage devices coupled to one or more media players for use by one or more users. The integration of media storage devices and media players into a single media space permits distributed management and control of content available within the media space.

Figure 1:
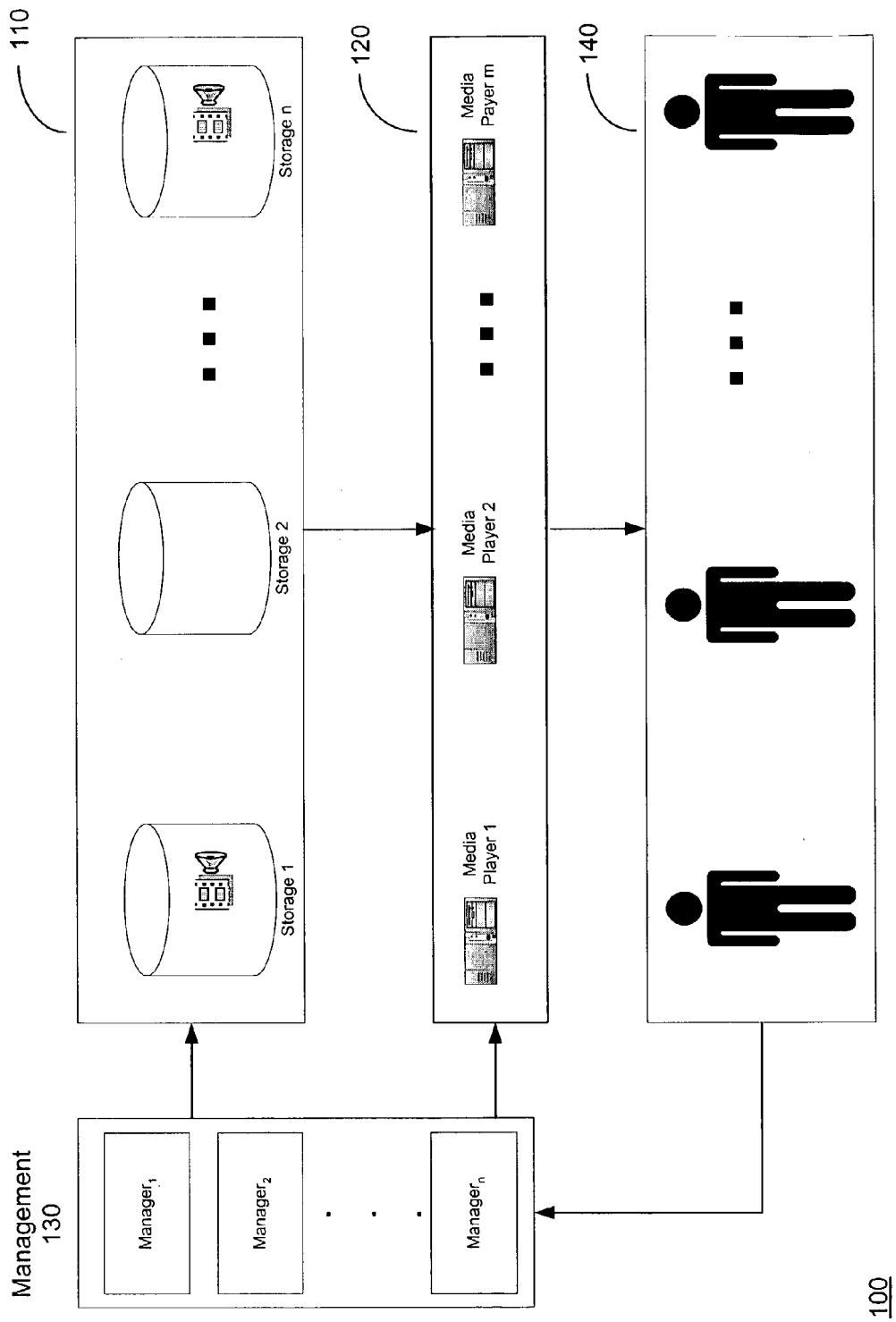
FIG. 1 illustrates a media space configured in accordance with one embodiment of the present invention.

FIG. 1 illustrates a media space configured in accordance with one embodiment of the present invention. As shown in FIG. 1, the media space 100 includes "n" media storage devices 110, where "n" is any integer value greater than or equal to one. The media storage devices 110 store any type of media. In one embodiment, the media storage devices 110 store digital media, such as digital audio, digital video (e.g., DVD, MPEG, etc.), and digital images. The media space 100 also includes "m" media players 120, where "m" is any integer value greater than or equal to one. In general, the media players 120 are devices suitable for playing and or viewing various types of media. For example, a media player may comprise a stereo system for playing music or a television for playing DVDs or viewing digital photos.

As shown in FIG. 1, the media storage devices 110 are coupled to the media players 120. The media storage devices 110 and the media players 120 are shown in FIG. 1 as separate devices to depict the separate functions of media storage and media playback; however, the media players may perform both the storage and playback functions. For example, a media player may comprise a DVD player that includes a hard drive for the storage and playback of digital video. In other embodiments, the storage of media and the playback/viewing of media are performed by separate devices. For this embodiment, the media players 120 playback content stored on the media storage devices 110. For example, a video clip stored on media storage device "1" may be played on any of the applicable "m" media players 120.

The storage devices 110 and media players 120 are controlled by management component 130. In general, management component 130 permits users to aggregate, organize, control (e.g., add, delete or modify), browse, and playback media available within the media space 100. The management component 130 may be implemented across multiple devices. The media space of FIG. 1 shows a plurality of users 140 to depict that more than one user may playback/view media through different media players. The system supports playback of different media through multiple media players (i.e., the system provides multiple streams of media simultaneously). The users 140, through management component 130, may also organize, control, and browse media available within the media space. The management component 130 provides a distributed means to manage and control all media within the media space.

Figure 2:
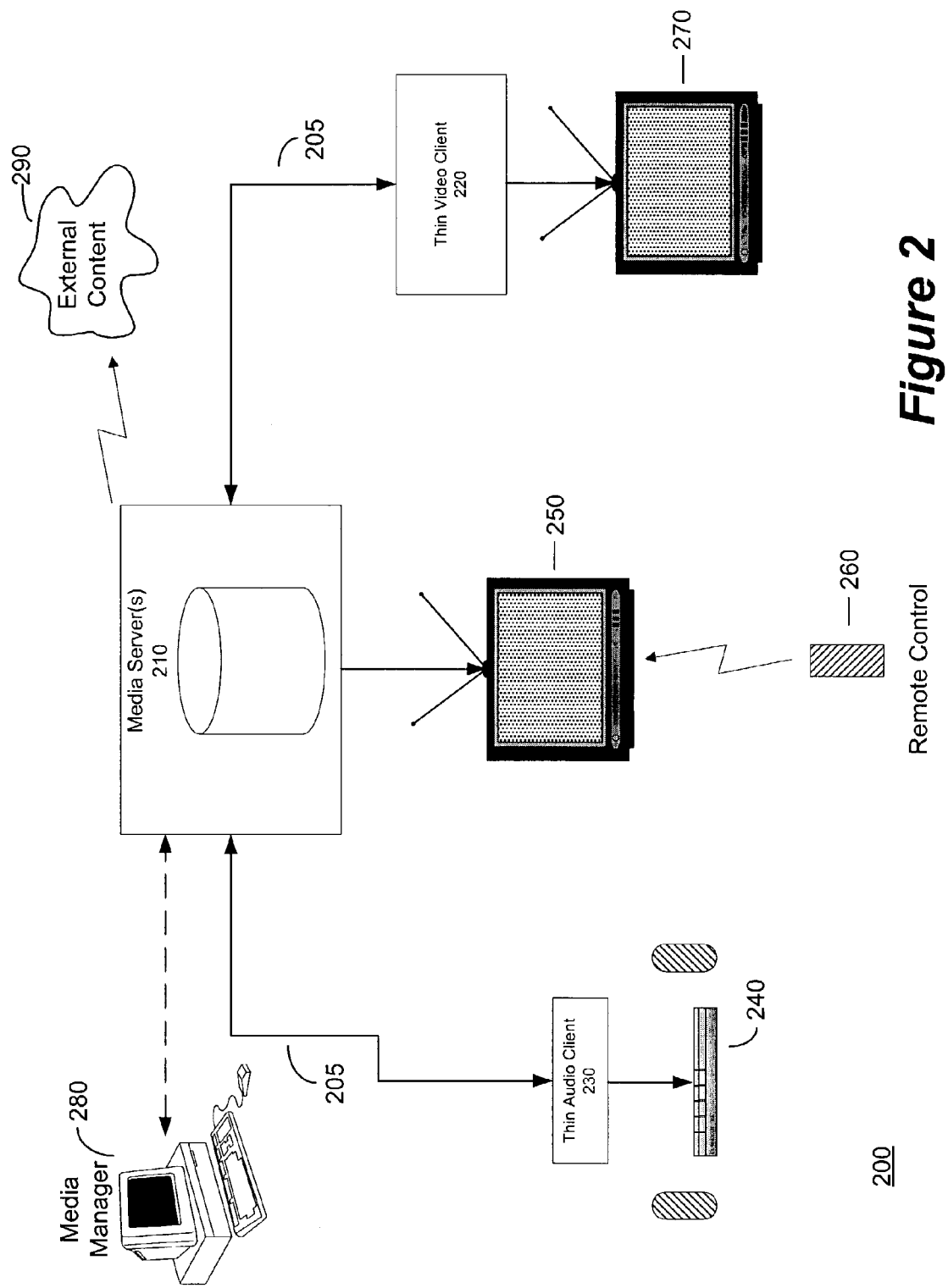
FIG. 2 illustrates one embodiment for integrating devices into a single media space.

FIG. 2 illustrates one embodiment for integrating devices into a single media space. For this embodiment, a media space 200 includes at least one media server 210 (e.g., a media space may include many media servers). The media server 210 stores media for distribution throughout the media space 200. In addition, the media server 210 stores system software to integrate the components of the media space, to distribute media through the media space, and to provide a user interface for the components of the media space. The media server 210 is coupled to different types of media players, including televisions 250 and 270, as well as an audio player 240 (e.g., stereo system). For this embodiment, the media server 210 is also coupled to a media manager 280 and to external content provider(s) 290.

For this embodiment, the media server 210 executes software to perform a variety of functions within the media space. Thus, in this configuration, the media server 210 operates as a "thick client." A user accesses and controls the functions of the media convergence platform through a system user interface. The user interface utilizes the thick and thin clients, as well as some media players (e.g., televisions 250 & 270). In one embodiment, the user interface includes a plurality of interactive screens displayed on media player output devices to permit a user to access the functionality of the system. A screen of the user interface includes one or more items for selection by a user. The user navigates through the user interface using a remote control device (e.g., remote control 260). The user, through use of a remote control, controls the display of screens in the user interface and selects items displayed on the screens. A user interface displayed on a television permits the user, using a remote control, to perform a variety of functions pertaining to the media available in the media space.

The components of the media convergence platform are integrated through a network. For example, in the embodiment of FIG. 2, media server 210 communicates to thin audio client 230 and thin video client 220 through network 205. Network 205 may comprise any type of network, including wireless networks. For example, network 205 may comprise networks implemented in accordance with standards, such as Ethernet 10/100 on Category 5, HPNA, Home Plug, IEEE 802.11x, IEEE 1394, and USB 1.1/2.0.

For the embodiment of FIG. 2, one or more thin video clients are integrated into the media space. Specifically, a thin video client 220 is coupled to media server 210 to provide playback of digital media on television 270. The thin video client 220 does not store media. Instead, the thin video client 270 receives media from media server 210, and processes the media for display or playback on television 270 (e.g., a standard television). For example, media server 210 transmits a digital movie over network 205, and the thin video client processes the digital movie for display on television 270. In one embodiment, the thin video client 220 processes the digital movie "on the fly" to provide NTSC or PAL formatted video for playback on television 270. The thin video client 220 may be integrated into the television 270. In one embodiment, a user interface is implemented using media server 210 and thin video client 220 for display on television 270. For this embodiment, the user, using a remote control for television 270, selects items displayed on television 270 to command the system.

The media convergence platform system also optionally integrates one or more thin audio clients into the media space. For the embodiment of FIG. 2, a thin audio client 230 receives digital music (e.g., MP3 format) from media server 210 over network 205, and processes the digital music for playback on a standard audio system 240. In one embodiment, the thin audio client 210 includes a small display (e.g., liquid crystal display "LCD") and buttons for use as a user interface. The media server 210 transmits items and identifiers for the items for display on the thin audio client 230. For example, the thin audio client 230 may display lists of tracks for playback on audio system 240. The user selects items displayed on the screen using the buttons to command the system. For example, the thin audio client screen may display a list of albums available in the media space, and the user, through use of the buttons, may command the user interface to display a list of tracks for a selected album. Then, the user may select a track displayed on the screen for playback on audio system 240.

The media manager 280 is an optional component for the media convergence platform system. In general, the media manager 280 permits the user to organize, download, and edit media in the personal computer "PC" environment. The media manager may store media for integration into the media space (i.e., store media for use by other components in the media space). In one embodiment, the media manager 280 permits the user to perform system functions on a PC that are less suitable for implementation on a television based user interface.

The media space may be extended to access media stored external to those components located in the same general physical proximity (e.g., a house). In one embodiment, the media convergence platform system integrates content from external sources into the media space. For example, as shown in FIG. 2, the media server 210 may access content external to the local network 205. The external content may include any type of media, such as digital music and video. The media convergence platform system may be coupled to external content 290 through a broadband connection (i.e., high bandwidth communications link) to permit downloading of media rich content. The external content may be delivered to the media convergence platform system through use of the Internet, or the external content may be delivered through use of private distribution networks. In other embodiments, the external content may be broadcasted. For example, the media server 210 may access external content 290 through a data casting service (i.e., data modulated and broadcast using RF, microwave, or satellite technology).

Remote Applications:

As used herein, a "remote application" connotes software, operating on a device other than a local device, used to provide functionality on a local device. As described herein, the techniques of the present invention do not require the remote application to possess pre-existing information about the characteristics of the local display device (e.g., display resolution, graphics capabilities, etc.).

In one embodiment, the software system separates the user interface ("UI") application logic from the UI rendering. In one implementation, the system defines user interface displays in terms of "abstract scenes." In general, an abstract scene is a layout for a screen display, and it consists of logical entities or elements. For example, an abstract scene may define, for a particular display, a title at the top of the display, a message at the bottom the display, and a list of elements in the middle of the display. The scene itself does not define the particular data for the title, message and list. In one implementation, the software comprises pre-defined scenes, UI application logic, a scene manager, and UI rendering engine. In general, pre-defined scenes describe an abstract layout in terms of logical entities for a UI display. Typically, the application logic determines the scene and provides data to populate the scene based on the logical flow of the application. For example, a user may select a first item displayed on the current UI display. In response, the application logic selects, if applicable, a new abstract scene and data to populate the new scene based on the user selection.

The application logic is implemented independent of the scene and the UI rendering. The application logic selects a scene descriptor, to define an abstract layout, in terms of the abstract elements. The application logic then populates the logical elements with data, and transfers the abstract layout (scene descriptors) with data to the display client. A scene manager, running on the local client, interprets the scene descriptors based on the display capabilities of the display client. For example, if the display for a display client is only capable of displaying lists, then the scene manager translates the scene with data to display only lists. This translation may result in deleting some information from the scene to render the display. The scene manager may convert other logical elements to a list for display on the LCD display. The UI rendering engine renders display data for the scene with display elements particular to the output display for the display client. The display elements include display resolution, font size for textual display, the ability to display graphics, etc. For example, if the output device is a television screen, then the UI rendering engine generates graphics data (i.e., RGB data) suitable for display of the scene on the television screen (e.g., proper resolution, font size, etc.). If the output display is a liquid crystal display ("LCD"), the UI rendering engine translates the scene logical entities to a format suitable for display on the LCD display.

A user interface implementation that separates the UI application logic from the UI rendering has several advantages. First, the application logic does not require any information regarding the capabilities of the output display.

Instead, the application logic only views the UI display in terms of logical entities, and populates data for those logic entities based on user input and logical flow of the user interface. Second, this separation permits a graphical designer of a user interface system to easily change the scenes of the user interface. For example, if a graphical designer desires to change a scene in the user interface, the graphical designer only changes the mapping from abstract to physical layout of the scene. During runtime, the application logic receives the revised scene descriptor, populates the revised scene descriptor with data via slots, and transmits the scene descriptor with data to the local client. Software on the local client determines those display elements to display the scene based on the device's display. Thus, a change to the scene does not require a change to the display elements particular to each output display because the conversion from the scene to the display elements occurs locally.

In one embodiment, the media convergence platform permits implementing user interface software remote from a device. In one implementation, the application logic is executed on a device remote from the device displaying a user interface. The device displaying the user interface contains the UI rendering software. For this implementation, the data and scenes for a user interface (e.g., scene descriptors) exist on a remote device. Using this implementation, the scene interface (interface between the scene descriptors and the application logic) is remote from the device rendering the display. The remote device (e.g., server) does not transfer large bitmaps across the network because only scene descriptor information with data is transferred. This delineation of functions provides a logical boundary between devices on a network that maximizes throughput over the network. In addition, a remote device hosting the application logic does not require information regarding display capabilities of each device on the home network. Thus, this implementation pushes the UI rendering software to the device rendering the images, while permitting the application logic to reside on other devices. This architecture permits implementing a thin client in a media convergence platform because the thin client need not run the application logic software. In addition, the architecture permits implementing a "thin application server" because the application server does not need to know about every possible rendering client type.

Figure 3:
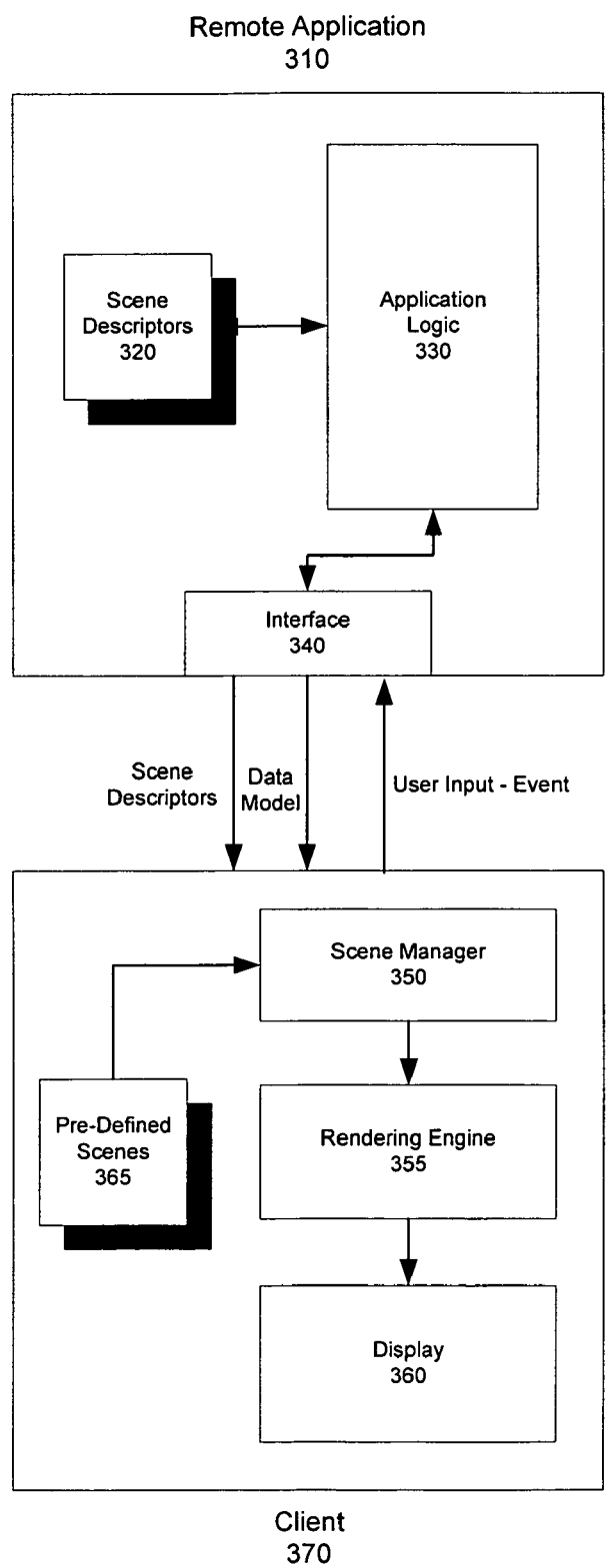
FIG. 3 is a block diagram illustrating one embodiment for implementing a remote application.

FIG. 3 is a block diagram illustrating one embodiment for implementing a remote application. For this example embodiment, a remote application 310 includes scene descriptors 320 and application logic 330. For example, remote application 310 may comprise a media server with considerable processing capabilities, such as a computer or set-top box. A client device, 370, has a display 360, for displaying information to a user (e.g., displaying data to implement a user interface), a rendering engine 355, and a scene manager 350. The rendering engine 355 receives, as input, data model from scene manager 350, and generates, as output, display data. The display data is a type of data necessary to render an image on the display 360. For example, if the display 360 comprises a graphics display, then display data includes information (e.g., RGB data) to render a graphical image on a display.

FIG. 3 illustrates separating a UI rendering, implemented on a client device, from application logic implemented on a remote device (310). In an example operation, a list of objects (e.g., musical albums) may be displayed on display 360. In this example, the user may select an album for playback. A scene descriptor (320) may define an abstract layout for this application. For example, the scene descriptor may define a list of audio track elements and control information. The application logic 330 receives the scene descriptor. The application logic 330 populates the elements of the scene descriptor with data particular to the selection. Thus, for this example, application logic 330 populates the list of audio track elements with the names of the audio tracks for the album selected by the user. The application logic 330 then transmits, through interface 340, the scene data to the scene manager 350 on client 370. The scene manager 350 converts the scene elements with data to the display elements. The rendering engine 355 generates data in a format suitable for display on display 360. For example, if display 360 is an LCD display, then rendering engine 355 generates a textual list of audio tracks. In another example, if display 360 is a graphics display, then rendering engine 355 generates graphics data (e.g., RGB), for the list of audio tracks.

In one embodiment, the techniques use "abstract scenes", defined by scene descriptors, to implement a user interface. In one embodiment, each application communicates in terms of at least one scene descriptor. A scene descriptor, in its simplest form, may constitute a list (e.g., a list scene). In general, a scene descriptor defines a plurality of slots and the relative locations of those slots for rendering the scene on an output display. The slots of a scene provide the framework for an application to render specific information on a display. However, an abstract scene defined by a scene descriptor does not define specific content for a slot. The abstract scene is developed in the application layout section on the remote computer (i.e., the computer operating the remote application).

In one embodiment, the system divides labor between the remote application computer and the local display computer through use of scene descriptors. Specifically, the remote application communicates the scene descriptor, in terms of logical coordinates, to the local display computer. The local display computer translates the scene descriptor based on its underlying display capabilities. In other embodiments, the remote application may define additional information about a scene, so as to shift more UI operations to the remote application. In yet other embodiments, the remote application may provide less information about a scene, thereby assigning more UI operations to the local client computer.

Figure 4:
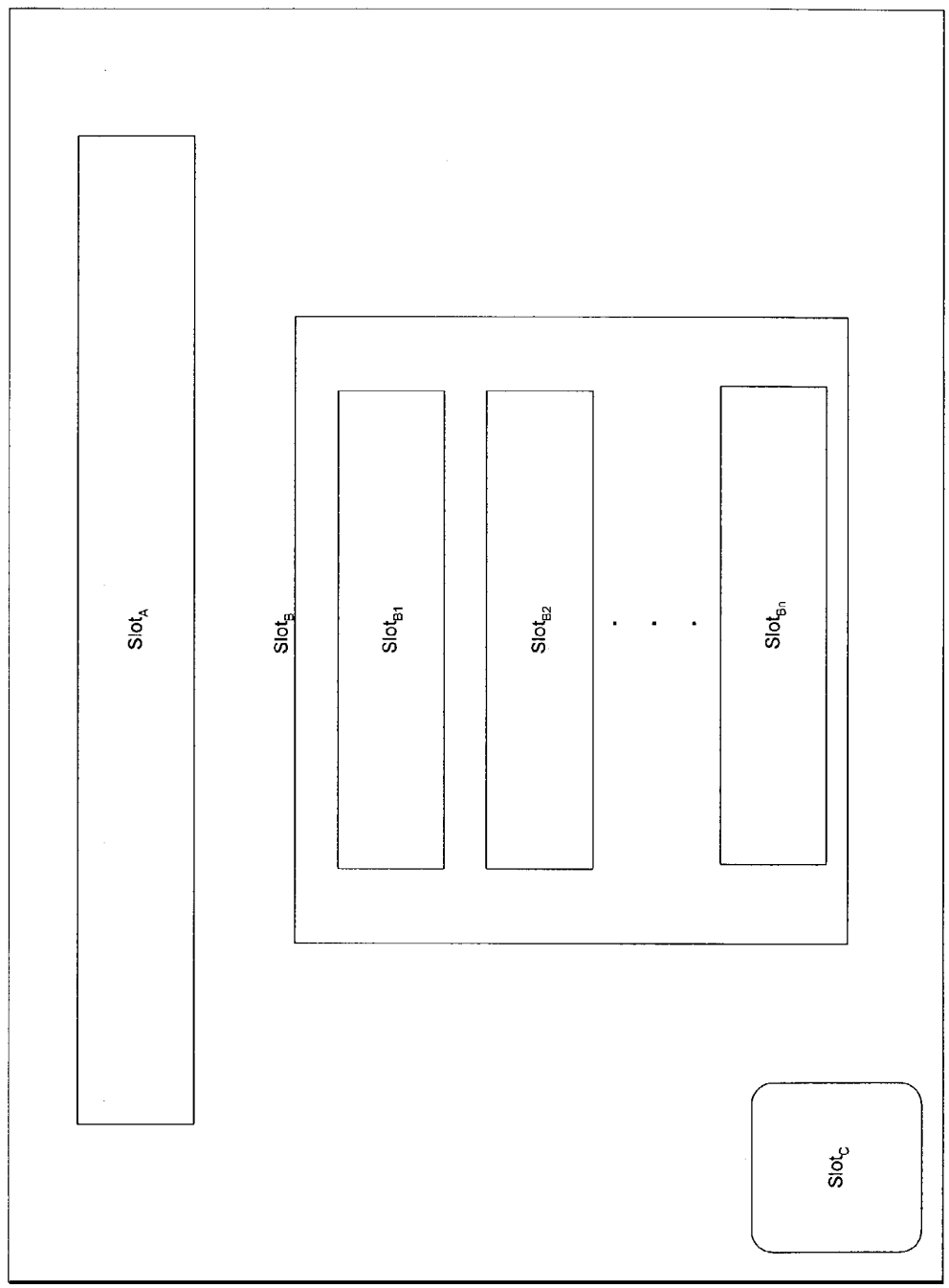
FIG. 4 is a block diagram illustrating an example abstract scene layout.

As an example, a scene descriptor may include one or more titles, a message, and a list of elements. FIG. 4 is a block diagram illustrating an example scene descriptor. As shown in FIG. 4, the example scene includes a plurality of slots (i.e., A, B and C). A $slot_A$, located on the top of the scene, may be used to display a major title (e.g., the title of the application). $Slot_B$, located in the center of the scene, includes a plurality of elements, 1–n, to display a list. For example, $slot_B$ may be used by the application to display menu items. For this example, each subcomponent (e.g., $slot_{B1}$, $slot_{B2}$ ... $slot_{Bn}$) may represent a menu item. In one application, the menu items comprise media items (e.g., music, video, etc.) available in a media system. The number of menu items displayed may be variable and dependent upon the display capabilities of the local computer. The third slot shown in FIG. 4, $slot_C$, is displayed in the lower left corner. The remote application may use $slot_C$ to display an icon (e.g., a logo for the remote application software publisher).

In one embodiment, the remote application constructs a list of elements for a scene descriptor, which includes data for display in the slots, and transfers the list of elements in a block defined by the interface (e.g., interface 340, FIG. 3) to the local display device. In one embodiment, the remote application interrogates the scene (at the client) to determine the number of visible elements for display, and then retrieves the list items for those visible elements. For example, the list elements may include a data model, abstract interface model, raw string, etc.

In one embodiment, "widgets", a software implementation, are used in the user interface For this embodiment, an abstract scene is implemented with a collection of widgets. A widget corresponds to one or more slots on an abstract scene. In one implementation, a widget comprises a controller, model, and view subcomponents. A view is an interpretation of the abstract scene suitable for a specific display. For example, a first view of an abstract scene may be suitable for rendering on a graphical display, and a second view of an abstract scene may be suitable for rendering the abstract scene on an LCD display. The model provides the underlining data for slots of an abstract scene. For example, if a slot consists of a list of menu items, then the model for that slot may include a list of text strings to display the menu items. Finally, a controller provides the logic to interpret user interface events (i.e., user input to the user interface). For example, if a user selects a menu item displayed on the user interface, an event is generated to indicate the selection of the item. The controller provides the logic to interpret the event, and initiate, if necessary, a new model and view.

Figure 5:
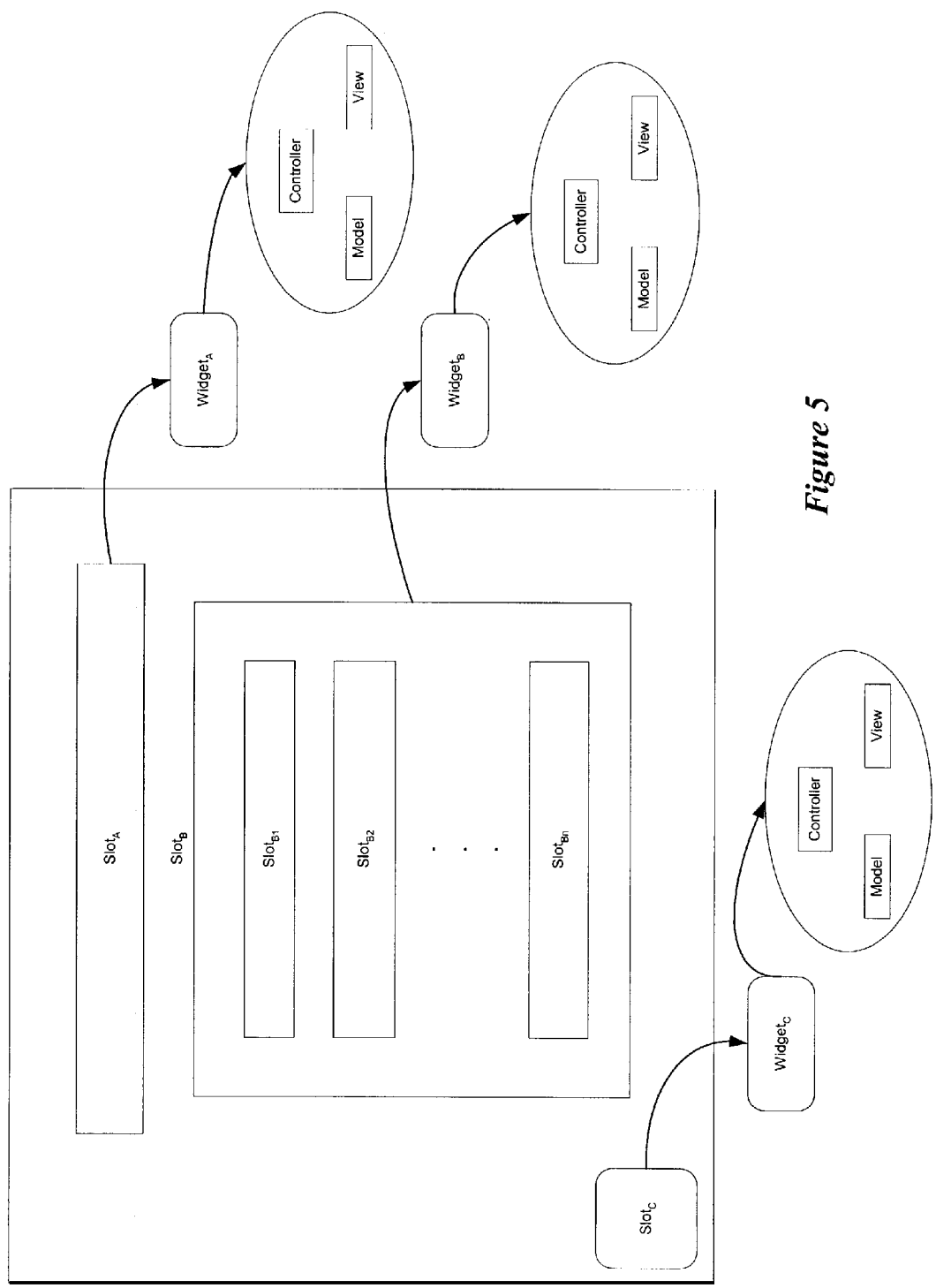
FIG. 5 is a block diagram illustrating one embodiment for implementing an abstract scene with widgets.

FIG. 5 is a block diagram illustrating one embodiment for implementing an abstract scene with widgets. The example abstract scene of FIG. 4 is shown in FIG. 5. A widget corresponds to each slot on the abstract scene. Specifically, widget$_A$ is instantiated for slot$_A$, widget$_B$ is instantiated for slot$_B$, and widget$_C$ is instantiated for slot$_C$. Also, as shown in FIG. 5, each widget (A, B and C) includes a controller, model and view. Note that slot$_B$ on the abstract interface includes a number of subcomponents. Widget$_B$ may be configured to render slot$_B$, and its subcomponents.

Figure 6:
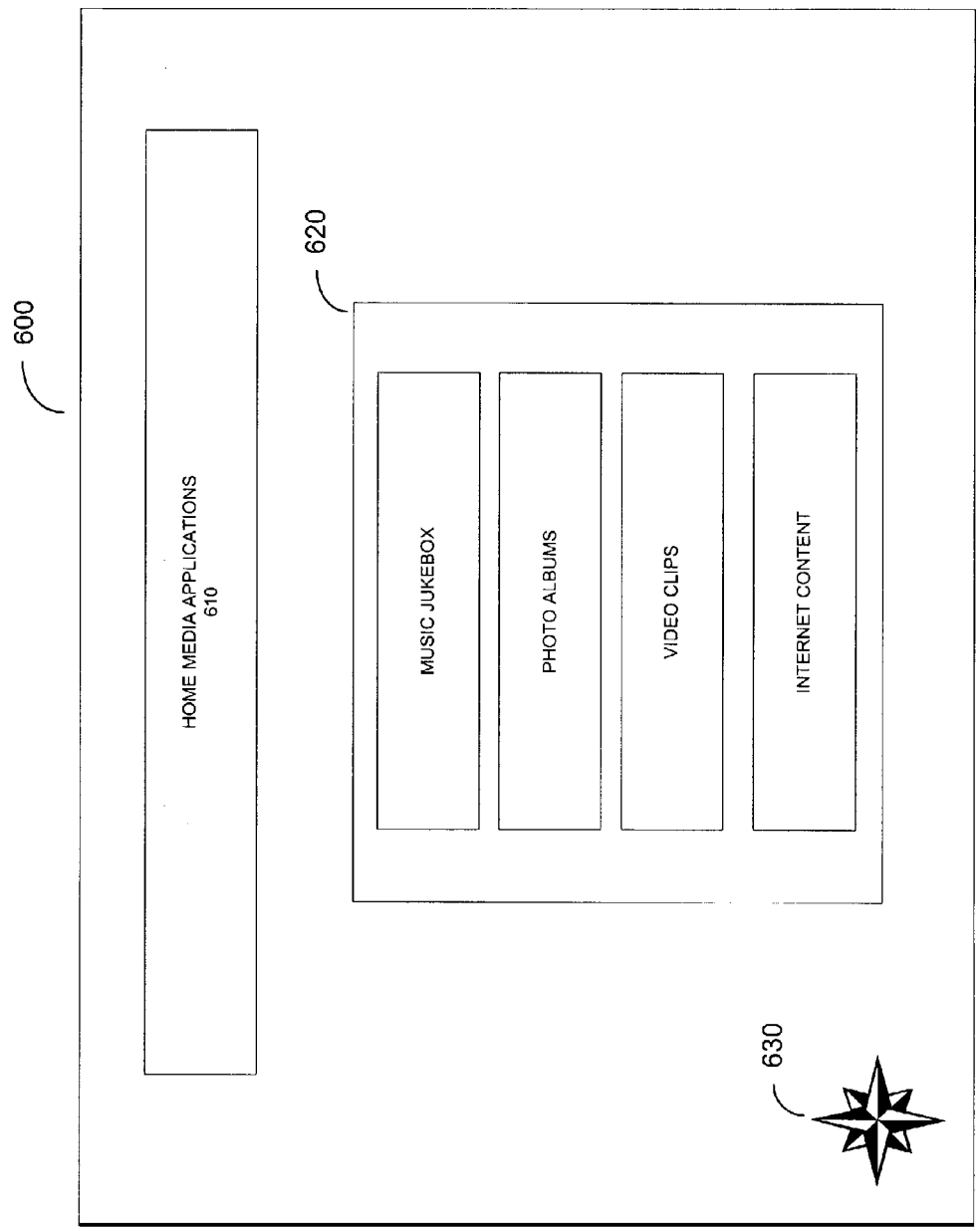
FIG. 6 illustrates an example screen display generated for a graphics display.
Figure 7:
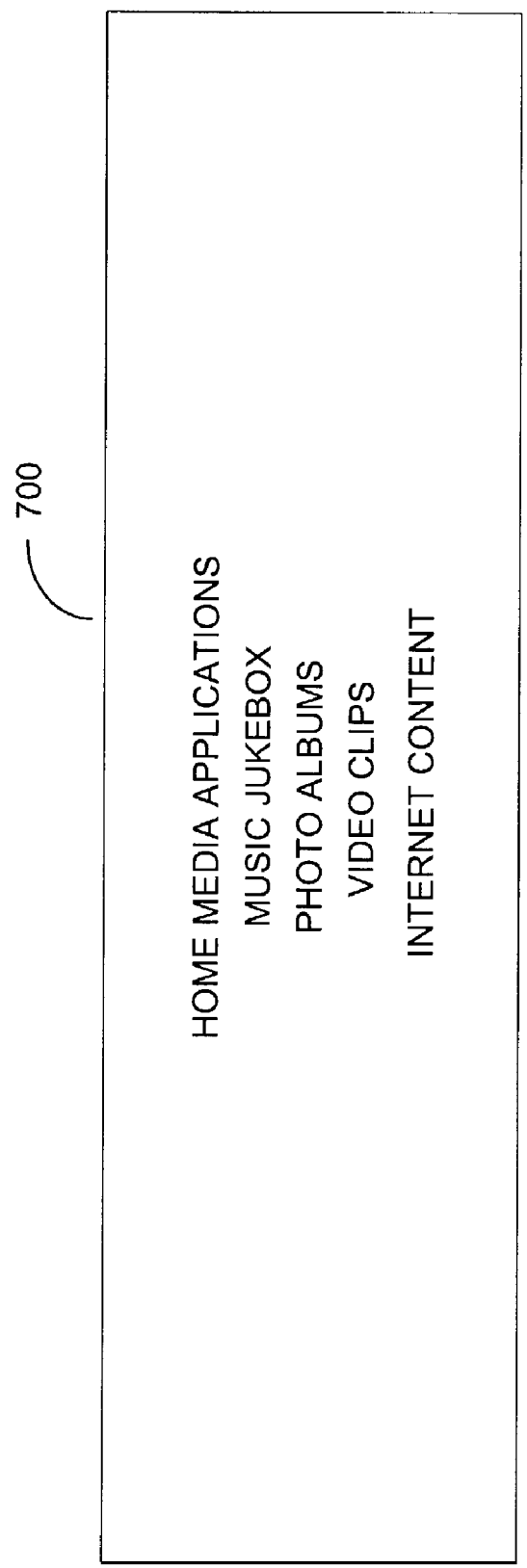
FIG. 7 illustrates an example screen display generated for a liquid crystal display ("LCD").

FIGS. 6 and 7 illustrate two different example screens supported by the techniques of the present invention. An example user interface display (e.g., screen) for a graphics display is shown in FIG. 6. A second example screen for a liquid crystal display ("LCD") is shown in FIG. 7. The example screens utilize the example scene descriptor of FIG. 4. The text string "Home Media Applications" is populated in Slot$_A$ (FIG. 4) on screen 600 of FIG. 6 and on screen 700 of FIG. 7. However, the underlying widget for screen 600 presents the text string, "Home Media Applications", in a box. For the LCD display 700, the text string "Home Media Applications" is displayed on the first line of the display. Slot$_B$ (FIG. 4) contains a plurality of elements. For this example, the elements represent menu items (i.e., home media applications available). Each element (i.e., "Music Jukebox", "Photo Albums", "Video Clips", and "Internet Content") is individually displayed in a graphics box on display 600. For display 700, the menu items are displayed on individual lines of the LCD display. A third slot, Slot$_C$, for the scene descriptor (FIG. 4) is displayed on screen 600 as a graphical symbol. The LCD display 700 (FIG. 7) can't display graphics, and therefore the graphics symbol is not displayed. The example user interface displays of FIGS. 6 and 7 illustrate two different screens generated for the same remote application.

Figure 9:
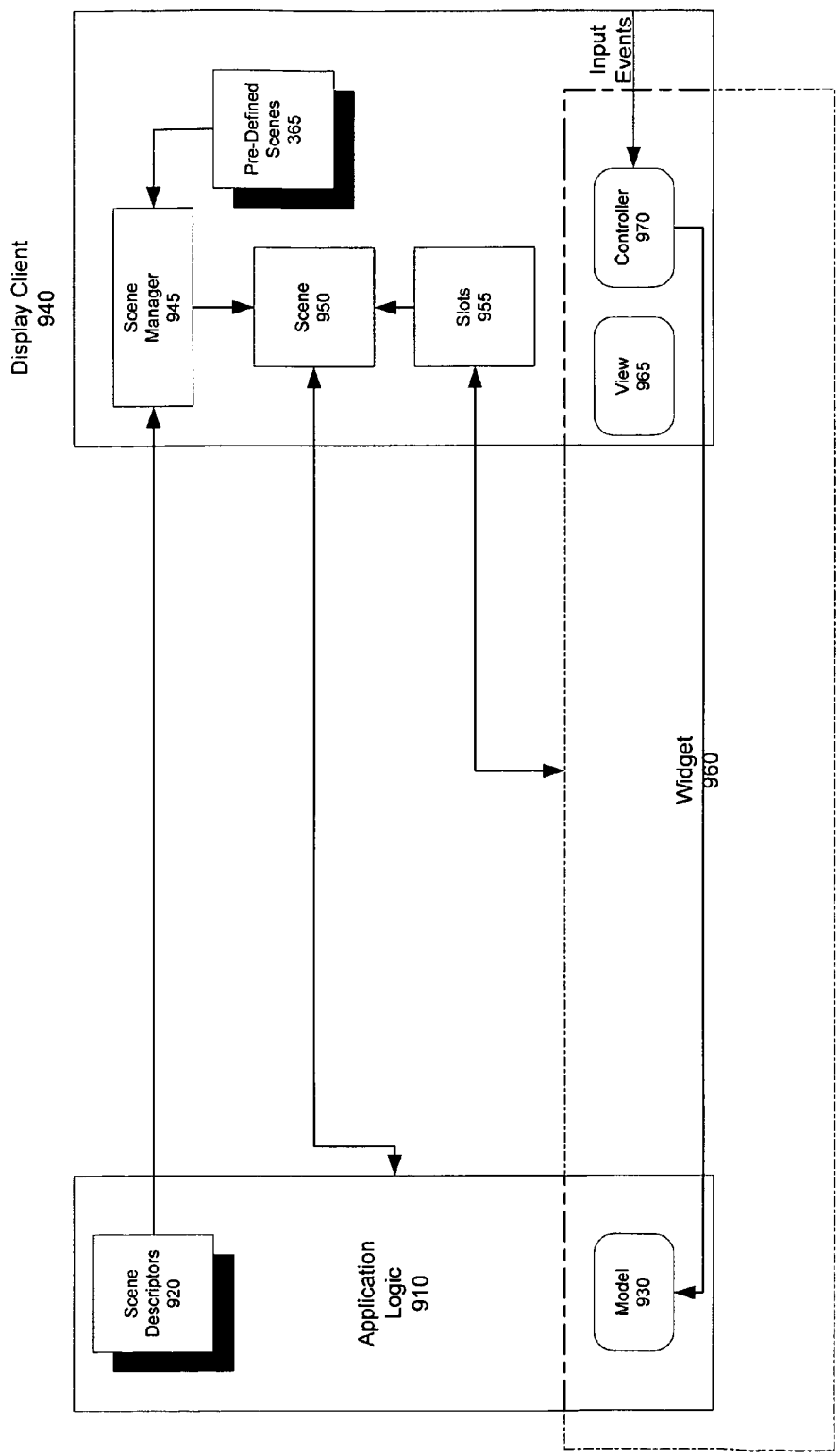
FIG. 9 is a block diagram illustrating another embodiment for implementing a remote application.

FIG. 9 is a block diagram illustrating another embodiment for implementing a remote application. The application logic 910 implements the functionality of an application program, and display client 940 implements a user interface. As shown in FIG. 9, to implement the application, application logic 910 communicates with display client 940 in a manner to divide functionality between application logic 910 and display client 940. For this embodiment, display client 940 performs more functions than a purely "thin" client (i.e., display client 940 may be described as a "thicker" client). The display client 940 includes modules to implement a user interface for the application specific to the display capabilities of the display client. To this end, display client 940 includes scene manager 945, scene 950, slots 955, and pre-defined scenes 365. A widget, 960, includes model 930, view 965, and controller 970 components implemented in both application logic 910 and display client 940. The dashed line around widget 960 indicates that the widget is implemented across both application logic 910 and display client 940. Specifically, display client 940 implements controller 970 and view 965 portions of widget 960. The model portion of widget 960 is implemented on application logic 910 (i.e., model 930). As shown in FIG. 9, application logic 910 also includes scene descriptors 920.

In operation, application logic 910 selects an abstract scene for the user interface. To this end, application logic 910 interrogates display client 940 to determine the scenes supported by display client 940 (i.e., scenes available in pre-defined scenes 365). The application logic 910 transmits a scene descriptor (one of scene descriptors 920) to display client 945 to identify the abstract scene. Based on the scene descriptor, the scene manager module 945 instantiates a scene for the user interface. The instantiated scene is depicted in FIG. 9 as scene 950. The scene 950 aggregates through the slots 955 to compose a user interface screen. The slots 955 of scene 950 are populated through use of widget 960. Specifically, input events, input from the user through the user interface, are processed by controller 970. The model to support the slots is provided from the model 930 in application logic 910. Finally, the view of each slot is supported by view module 965, implemented by the display client 940.

Figure 8:
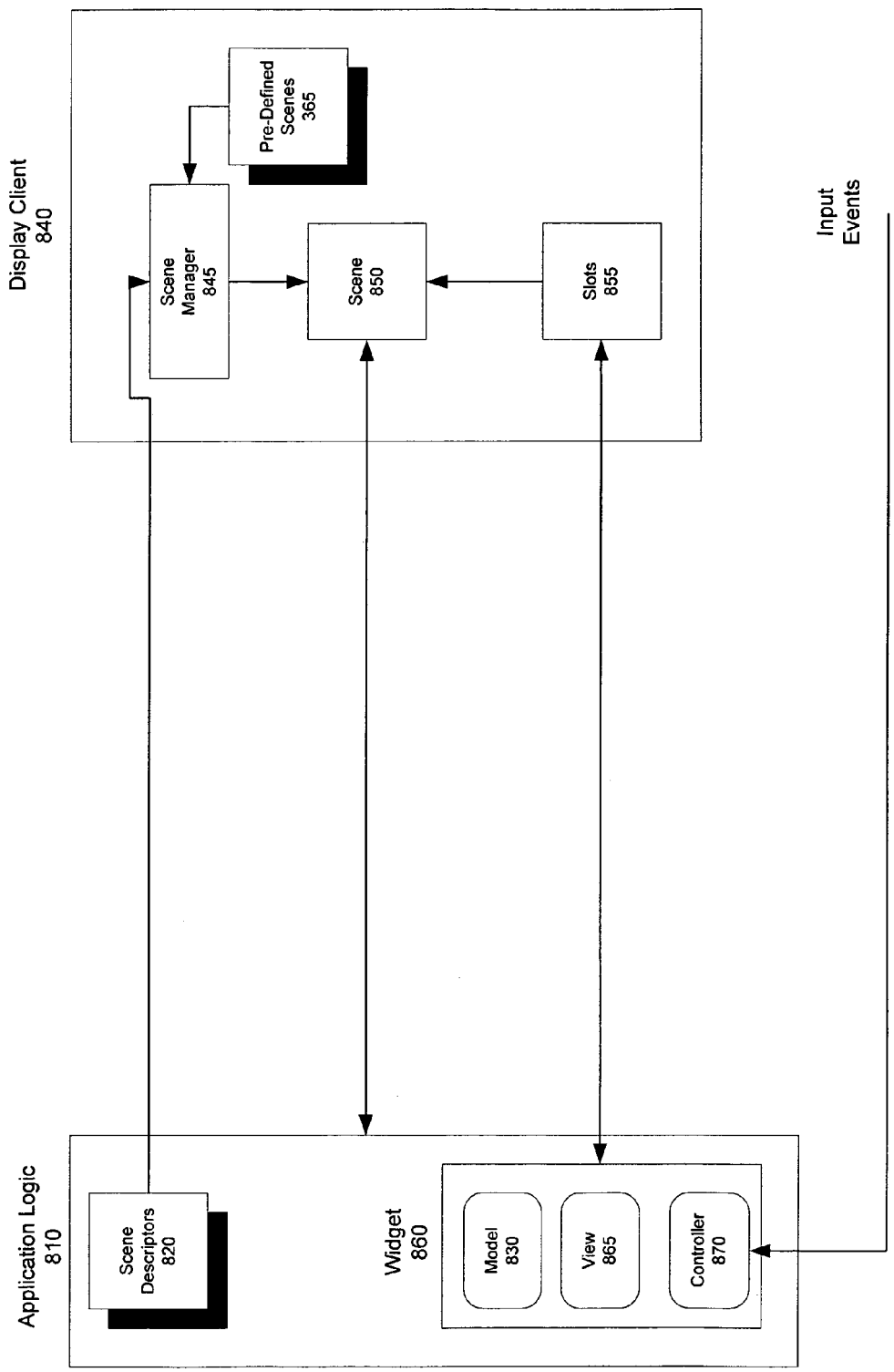
FIG. 8 is a block diagram illustrating a further embodiment for implementing a remote application.
Figure 10:
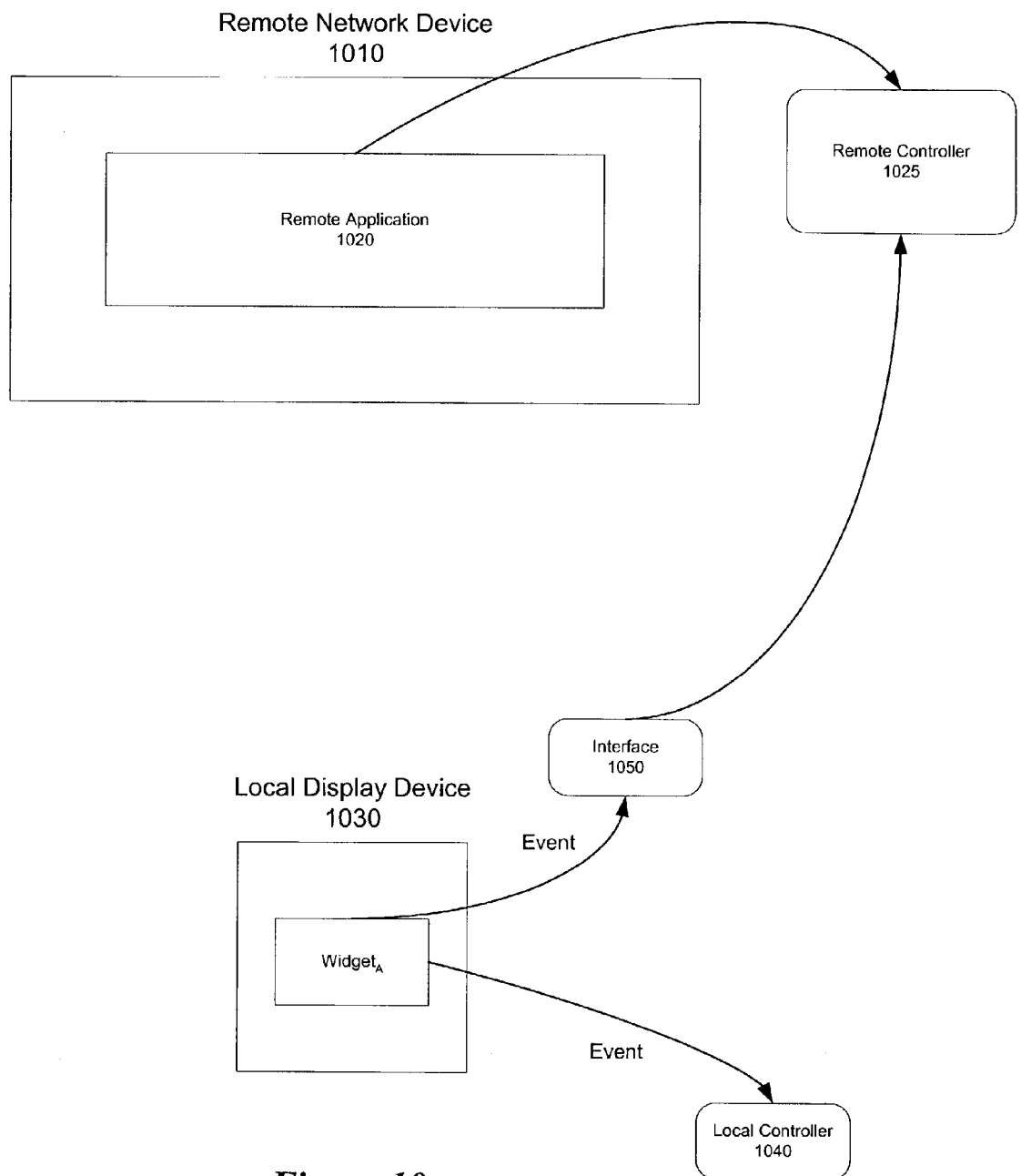
FIG. 10 is a block diagram illustrating one embodiment for implementing widget-based controllers for the remote user interface of the present invention.

FIG. 8 is a block diagram illustrating a further embodiment for implementing a remote application. For this embodiment, widget 860, supporting the slots for a scene, is implemented entirely on application logic 810. Thus, for this embodiment, display client 840 may be characterized as a "thin" client. Similar to the embodiment of FIG. 9, application logic 810 interrogates display client 840 to determine the available scenes (i.e., scenes available in predefined scenes 865). To implement the user interface on display client 840, application logic 810 transmits, over a network, a scene descriptor to identify an abstract scene. Based on the scene descriptor, scene manager 845 instantiates a scene (e.g., scene 850). The slots for the scene are populated through use of widget 860. Specifically, input events, received from the user interface, are propagated, across the network, to controller module 870. Model 830 provides data to support the user interface slots, and view module 865 supports the view module 865. For this embodiment, both the model and the view modules are implemented on application logic 810. As shown in FIG. 8, the view is communicated back to display client 850. The scene 850 aggregates through the slots 855 to generate a screen for the user interface. The software for the controller portion of a widget may reside locally on a client, or may be invoked across the network from a remote network device. FIG. 10 is a block diagram illustrating one embodiment for implementing widget-based controllers for the remote user interface of the present invention. For this example, local display device 1030 instantiates a widget, widget$_A$, to control and render one or more slots of the abstract scene. For this example, widget$_A$ consists of software located on both the local display device 1030 (local controller 1040) and on the client network device 1010 (remote controller 1025). For this implementation, the local controller 1040 processes certain events for widget$_4$. Typically, local controller 1040 may process simple events that are less driven by the application logic. For example, an event may be generated when a user moves the cursor from one item on a list to another. In response to this action, the user interface may highlight each item to indicate the placement of the user's cursor. For this example, a widget may use local controller 1040 to process the event to initiate a new model and view (e.g., render a highlighted menu item on the list).

Other events may require more sophisticated operations from the underlining remote application. In one embodiment, to accomplish this, the remote application (1020), operating on client network device (1010), instantiates a remote controller (1025). In other embodiments, remote controller 1025 may not be a separate object, but may be part of procedural code within remote application 1020. As shown in FIG. 10, widget$_4$, operating on local display device 1030, propagates an event to remote controller 1025 through interface 1050. In one embodiment, widget$_4$ uses a remote procedure call ("RPC") mechanism to invoke remote controller 1025 on remote network device 1010 for operation at the local display device 1030. For example, widget$_4$ may receive an event from a user to select an application displayed on the screen from a menu list of available applications. In response to the event, the remote controller 1025 may generate a top menu screen for the new application. The new top menu screen may require a new scene descriptor, or may use the existing scene descriptor.

Figure 11:
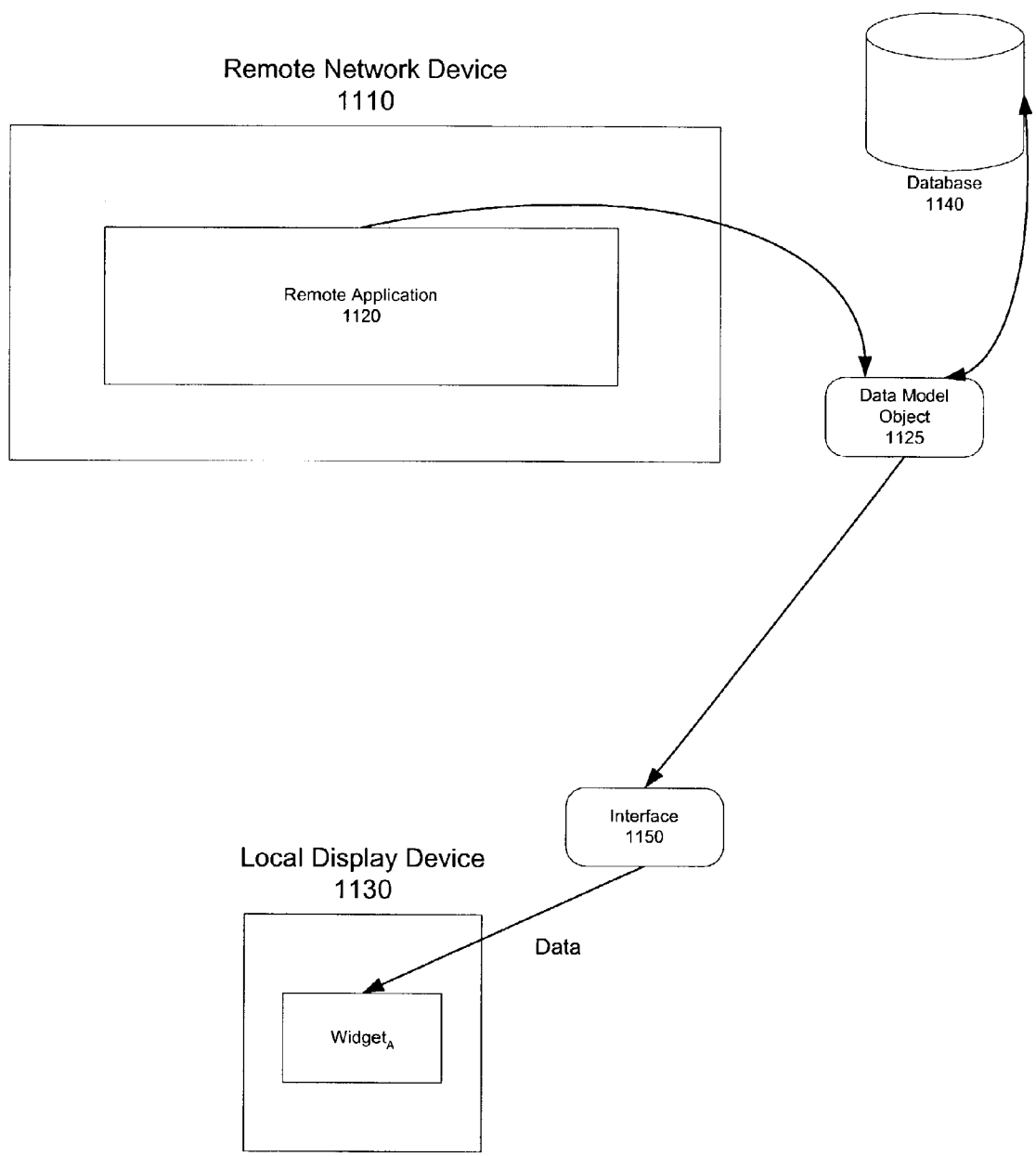
FIG. 11 is a block diagram illustrating one embodiment for providing a model for a user interface.

Data may be supplied to a local display device either locally or from across the network. FIG. 11 is a block diagram illustrating one embodiment for providing a model for a user interface. For this embodiment, local display device 1130 operates remote application 1120 operating on remote network device 1110. The remote application 1120 instantiates a data model object 1125. For this example, data model object 1125 provides an interface to a data store 1140. The data store 1140 may reside on the remote network device 1110, or it may reside anywhere accessible by the network (e.g., another network device or a service integrating the data store from an external source to the network). For this embodiment, the controller (not shown) interprets an event, and invokes the data model object in accordance with the interpretation of the event. For example, in a media system, the controller may interpret an event that requests all available musical tracks within a specified genre. For this request, data model object 1125 may generate a query to database 1140 for all musical tracks classified in the specified genre. As shown in FIG. 11, data model object 1125 communicates the model (data) to local display device 1130 through interface 1150.

In other implementations, the model may comprise a text string. For example, a current UI screen may consist of a list of all high-level functions available to a user. For this example, a user may select a function, and in response, the system may display a list, which consists of text strings, of all sub-functions available for the selected function. In another embodiment, the data model may be provided as a handle to the user interface implementation.

Figure 12:
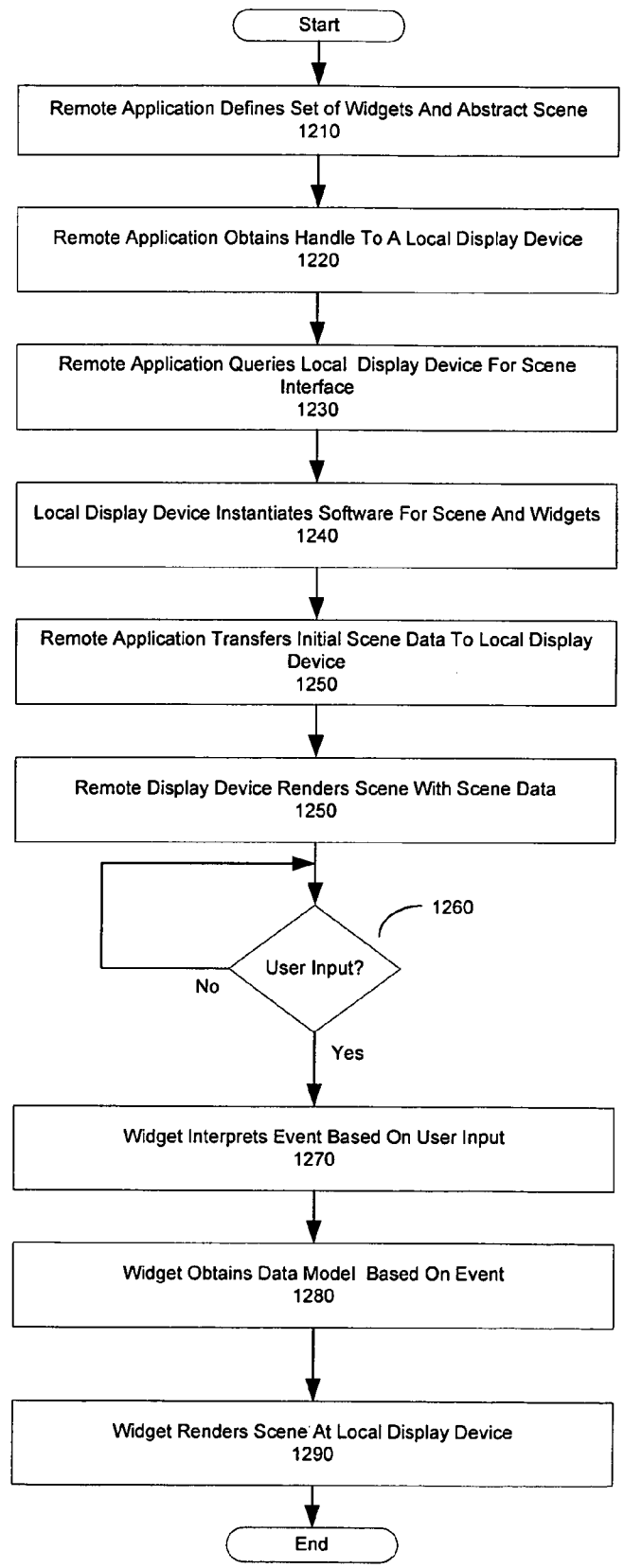
FIG. 12 is a flow diagram illustrating one embodiment for a method to remote an application.

FIG. 12 is a flow diagram illustrating one embodiment for a method to remote an application. First, the remote application defines a set of widgets and selects a scene descriptor that describes an abstract scene (block 1210, FIG. 12). The remote application obtains a handle to the local display device (block 1220, FIG. 12). The handle provides a means for the remote application to communicate with the local display device. The remote application queries the local display device for a scene interface for the defined scene descriptor (block 1230, FIG. 12). In general, the scene interface provides a means for the remote application and local display device to communicate in terms of an abstract scene. To this end, the scene interface defines slots for the abstract scene. For example, the remote application provides a data model by populating a data structure in the scene interface.

The local display device instantiates software to locally implement the abstract scene and widgets (block 1240, FIG. 12). As described above, a widget may incorporate all or portions of the controller, data, view subcomponents of a widget. The remote application transfers the initial scene data (model) to the local display device through the scene interface (block 1250, FIG. 12). In turn, the local display device renders the initial scene using the data model (block 1250, FIG. 12). When the user submits input to the user interface (e.g., the user selects a menu item from a list), the widget executes control logic based on the user input (i.e., event) (block 1270, FIG. 12). A new model is implemented based on interpretation of the user event (block 1280, FIG. 12). Also, the widget renders a new scene with the data model supplied (block 1290, FIG. 12).

Figure 13:
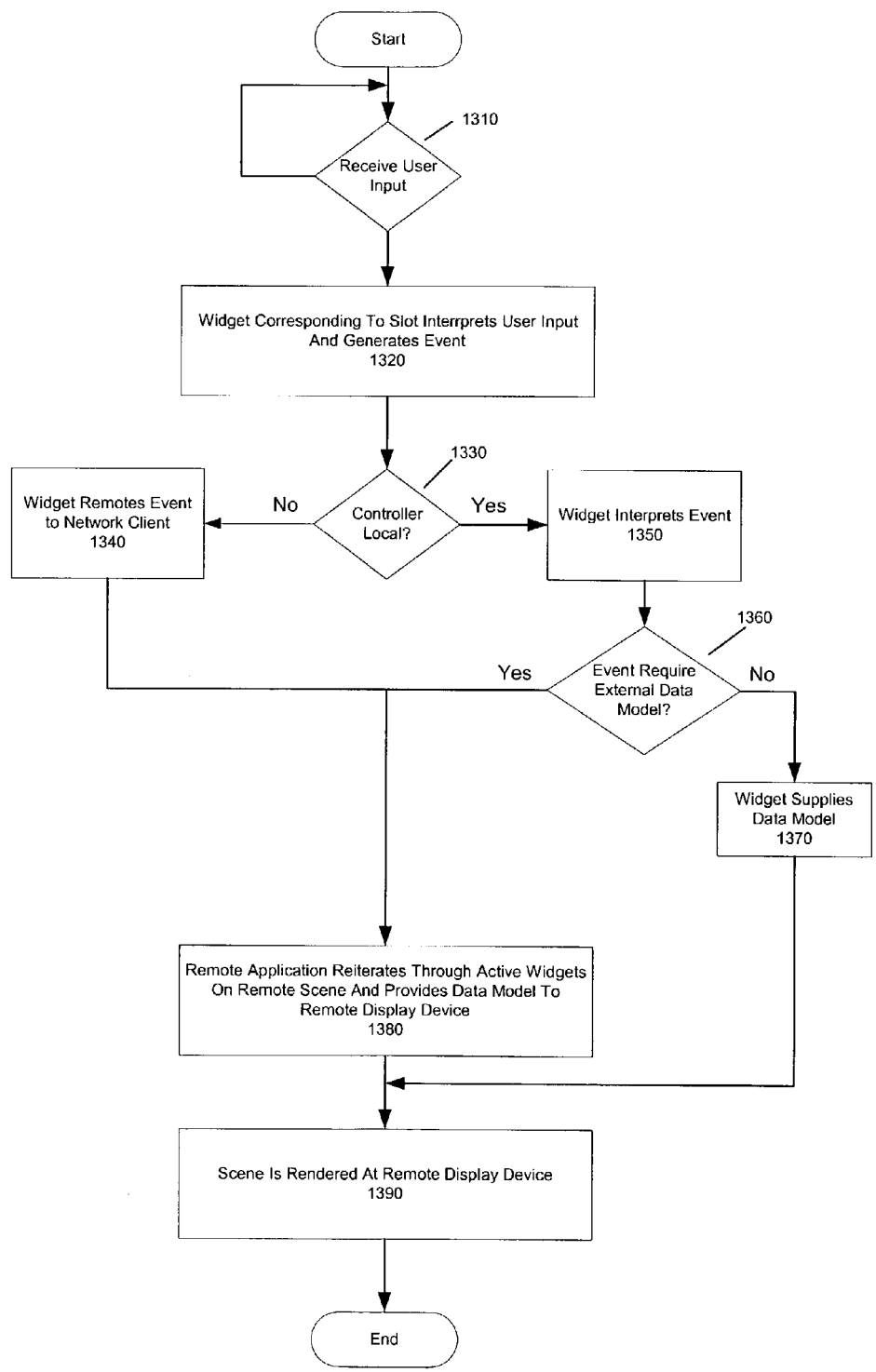
FIG. 13 is a flow diagram illustrating one embodiment for implementing a user interface from a remote application.

FIG. 13 is a flow diagram illustrating one embodiment for implementing a user interface from a remote application. The process is initiated when the user interface receives input from a user (block 1310, FIG. 13). A widget, corresponding to the slot on the abstract scene, interprets the user input and generates an event (block 1320, FIG. 13). For example, if the user selects a menu item displayed in a slot on the abstract scene, then the widget that manages the corresponding slot generates an event to signify selection of the menu item.

If the widget controller for the event is local, then the widget controller, operating on the local display device, interprets the event (blocks 1330 and 1350, FIG. 13). Alternatively, if the widget controller is implemented remotely, then the widget remotes the event across the network (block 1340, FIG. 13). If the widget interprets the event locally and the event does not require an external data model, then the widget supplies the data model (blocks 1360 and 1370, FIG. 13). If the event does require an external data model (over the network) or the widget remotes the controller over the network, then the remote application iterates through the active widgets on the remote scene and provides a data model to the local display device (blocks 1360 and 1380, FIG. 13). Using the data model, the scene is rendered at the local display device (block 13 90, FIG. 13).4Although the present invention has been described in terms of specific exemplary embodiments, it will be appreciated that various modifications and alterations might be made by those skilled in the art without departing from the spirit and scope of the invention.

What is claimed is:

1. A method for implementing, on first and second display clients, a user interface of an application program operating on a remote computer, said method comprising the steps of:
   operating application logic for said application program on said remote computer;
   transferring, from said remote computer to said first and second display clients, a scene descriptor identifying an abstract scene for at least one screen display of said user interface, wherein said first and second display clients have one or more different display characteristics comprising screen resolution, supported color palettes, or ability to produce graphics or textual display;

interpreting a first input event received through said user interface at first display client to generate first input event data and a second input event received through said user interface at second display client to generate second input event data;

interpreting said scene descriptor and said first input event data at said first display client based on one or more display characteristics of said first display client to generate first display data;

interpreting said scene descriptor and said second input event data at said second display client based on one or more display characteristics of said second display client to generate second display data; and displaying said first display data at said first display client and said second display data at said second display client to display the at least one screen display of said user interface at said first and second display clients.

2. The method as set forth in claim 1, wherein:

transferring a scene descriptor identifying a scene further comprises the step of assigning a plurality of slots to said scene;

generating said first display data comprises iterating through said slots of said scene to generate said first display data; and generating said second display data comprises iterating through said slots of said scene to generate said second display data.

3. The method as set forth in claim 1, further comprising implementing at least one widget comprising a controller for interpreting an input event, a model for generating input event data and a view for generating display data.

4. The method as set forth in claim 3, wherein implementing at least one widget comprises implementing a controller that is remote from or local to said first and second display clients.

5. The method as set forth in claim 3, wherein implementing at least one widget comprises implementing a model that is remote from or local to said first and second display clients.

6. The method as set forth in claim 3, wherein implementing at least one widget comprises implementing a view that is remote from or local to said first and second display clients.

7. The method as set forth in claim 1, wherein said user interface is implemented on said first and second display clients without said application program having information regarding display characteristics of the first and second display clients.

8. A system comprising:

network;

remote computer, coupled to said network, configured for operating application logic for an application program, for implementing, on first and second display clients, a user interface of said application program, and for transferring to said first and second display clients, a scene descriptor identifying an abstract scene for at least one screen display of said user interface, wherein said first and second display clients have one or more different display characteristics comprising screen resolution, supported color palettes, or ability to produce graphics or textual display;

software configured for interpreting a first input event to generate first input event data and a second input event to generate second input event data;

first display client, coupled to said network, configured for implementing a said user interface for receiving said first input event through said user interface, for interpreting said scene descriptor and said first input event data based on one or more display characteristics of said first display client to generate a first display data, and for displaying said first display data to display the at least one screen display of said user interface; and second display client, coupled to said network, configured for implementing said user interface, for receiving said second input event through said user interface, for interpreting said scene descriptor and said second input event data based on one or more display characteristics of said second display client to generate second display data, and for displaying said second display data to display the at least one screen display of said user interface.

9. The system as set forth in claim 8, wherein said first and second display clients are further configured for:

storing a plurality of pre-defined scenes; and instantiating said scene based on a pre-defined scene and said scene descriptor.

10. The system as set forth in claim 8, wherein:

transferring a scene descriptor identifying a scene comprises assigning a plurality of slots to said scene;

generating said first display data comprises iterating through said slots of said scene to generate said first display data; and generating said second display data comprises iterating through said slots of said scene to generate said second display data.

11. The system as set forth in claim 8, wherein said software comprises at least one widget comprising a controller configured for interpreting an input event, a model configured for generating input event data, and a view configured for generating display data.

12. The system as set forth in claim 11, wherein said controller of said widget is implemented remote from said first and second display clients or at said first and second display clients.

13. The system as set forth in claim 11, wherein said model of said widget is implemented remote from said first and second display clients or at said first and second display clients.

14. The system as set forth in claim 11, wherein said view of said widget is implemented remote from said first and second display clients or at said first and second display clients.

15. The system as set forth in claim 8, wherein said user interface is implemented on said first and second display clients without said application program having information regarding display characteristics of the first and second display clients.

16. A computer readable storage medium comprising a plurality of instructions stored thereon, which when executed, implement, on first and second display clients, a user interface of an application program operating on a remote computer, the computer readable medium comprising sets of instructions for:

operating application logic for an application program on a remote computer;

transferring, from said remote computer to said first and second display clients, a scene descriptor identifying an abstract scene for at least one screen display of said user interface, wherein said first and second display clients have one or more different display characteristics comprising screen resolution, supported color palettes, or ability to produce graphics or textual display;

interpreting a first input event received through said user interface at first display client to generate first input event data and a second input event received through said user interface at second display client to generate second input event data;

interpreting said scene descriptor and said first input event data at said first display client based on one or more display characteristics of said first display client to generate first display data;

interpreting said scene descriptor and said second input event data at said second display client based on one or more display characteristics of said second display client to generate second display data; and displaying said first display data at said first display client and said second display data at said second display client to display the at least one screen display of said user interface at said first and second display clients.

17. The computer readable storage medium as set forth in claim 16, wherein transferring a scene descriptor identifying a scene comprises:

storing a plurality of pre-defined scenes at said first and second display clients; and instantiating, at said first and second display clients, said scene based on a pre-defined scene and said scene descriptor.

18. The computer readable storage medium as set forth in claim 16, wherein:

transferring a scene descriptor identifying a scene further comprises the step of assigning a plurality of slots to said scene;

generating said first display data comprises iterating through said slots of said scene to generate said first display data; and generating said second display data comprises iterating through said slots of said scene to generate said second display data.

19. The computer readable storage medium as set forth in claim 16, further comprising a set of instructions for implementing at least one widget comprising a controller for interpreting an input event, a model for generating input event data, and a view for generating display data.

20. The computer readable storage medium as set forth in claim 19, wherein implementing at least one widget comprises implementing a controller that is remote from or local to said first and second display clients.

21. The computer readable storage medium as set forth in claim 19, wherein implementing at least one widget comprises implementing a model that is remote from or local to said first and second display clients.

22. The computer readable storage medium as set forth in claim 19, wherein implementing at least one widget comprises implementing a view that is remote from or local to said first and second display clients.

23. The computer readable storage medium as set forth in claim 16, wherein said user interface is implemented on said first and second display clients without said application program having information regarding display characteristics of the first and second display clients.

* * * * *